United States Patent [19]

Bellei

[11] Patent Number: 5,402,299
[45] Date of Patent: Mar. 28, 1995

[54] COORDINATION ARRANGMENT FOR PROTECTIVE DEVICES IN ELECTRICAL SYSTEMS

[75] Inventor: Terrance A. Bellei, Lake Forest, Ill.

[73] Assignee: S&C Electric Company, Chicago, Ill.

[21] Appl. No.: 947,675

[22] Filed: Sep. 18, 1992

[51] Int. Cl.[6] ............................................. H02H 3/00
[52] U.S. Cl. ....................................... 361/63; 361/67; 361/62
[58] Field of Search ..................... 361/62, 63, 64, 65, 361/95, 96, 97, 67

[56] References Cited

U.S. PATENT DOCUMENTS 4,571,658 2/1986 Ruta ........................................ 361/96
4,605,982 8/1986 Horner et al. ......................... 361/95

OTHER PUBLICATIONS

Photo Sheet 441-700 dated Apr. 30, 1984, S&C Electric Company.

Primary Examiner—A. D. Pellinen
Assistant Examiner—S. C. Medley
Attorney, Agent, or Firm—James V. Lapacek

[57] ABSTRACT

An arrangement to coordinate protective devices is provided by defining operation of the instantaneous characteristic portion of an upstream protective device to coordinate with a downstream current-limiting fuse based on the peak let-through current of the downstream current-limiting device, with instantaneous operation being set to occur only above the peak let-through current of the downstream current-limiting fuse. Accordingly, for fault currents which are seen by both the instantaneous device and the current-limiting device and that are within the ratings of the current-limiting device, the upstream device will not respond and the downstream current-limiting fuse will interrupt the fault, as intended.

10 Claims, 4 Drawing Sheets

SYSTEM ONE-LINE

FAULT FILTER

COORDINATION ONE-LINE

COORDINATION ARRANGEMENT FOR PROTECTIVE DEVICES IN ELECTRICAL SYSTEMS

BACKGROUND OF THE INVENTION

1. Field of the Invention

The present invention relates generally to the field of electrical power distribution systems and more particularly to an improved arrangement for coordinating operation of protective devices in a circuit to achieve coordination of devices not heretofore possible.

2. Description of the Related Art

Electrical power distribution systems include various protective devices arranged along the circuit for the appropriate and desirable protection of the power system and its components. Typical protective devices include circuit breakers, power fuses, and current-limiting fuses. Upon the occurrence of an overcurrent or fault condition, it is desirable to de-energize and isolate the smallest possible portion of the system. This is accomplished by the coordination of the operating characteristics of the protective devices so that the downstream devices (farthest from the source) operate before the operation of the protective devices located upstream.

In general and for the lower ranges of overcurrents and faults, a relatively good degree of coordination can be achieved with presently available devices. This coordination can, to some degree, be determined from a composite TCC (time-current characteristic) plot of current versus operating time for all of the devices. Further, the coordination can be verified by actual circuit tests under overcurrent and fault conditions.

Many protective devices include an inverse time-current characteristic which provides faster operating times for higher currents. Some devices additionally include an instantaneous portion applicable to currents above a certain range or value, where instantaneous is defined as operating with a minimum or no intentional time delay after the inception and detection of an overcurrent above the instantaneous level. For example, a circuit interrupter of this type is shown in U.S. Pat. No. 4,571,658. This rapid response is accomplished by sensing the rate of rise of the current (di/dt). One or more of the protective devices in the power system may also desirably include current-limiting characteristics.

To achieve coordination of the various devices including inverse-time, instantaneous, and current-limiting characteristics, circuit theory and application practice compare the let-through I²t (amperes-squared-seconds) of a downstream device with the minimum melt or minimum response I²t of the upstream device. For example, according to prior art coordination techniques, the total clearing I²t let-through of the downstream, load-side current-limiting fuse must be less than the minimum melting (or tripping) I²t of the source-side device having current-limiting characteristics. For high current ranges where coordination must still be achieved, since the devices with instantaneous characteristic portions have extremely low minimum tripping I²t values, coordination could not be achieved except for certain specific matchups of devices. Thus, unless the I²t characteristics were suitable for coordination in this manner, it has not been thought possible to coordinate a device having instantaneous characteristics with a downstream current-limiting fuse. These limitations in coordination interfere with a selection of the most desirable protection; that is, to utilize devices with the instantaneous responses along with devices with current-limiting characteristics to provide the best overall protection against cable faults while protecting downstream devices that could otherwise experience currents above their momentary capabilities.

SUMMARY OF THE INVENTION

Accordingly, it is a principal object of the present invention to provide an improved arrangement to coordinate protective devices having instantaneous operating characteristics with downstream current-limiting fuses.

It is another object of the present invention to coordinate operation of a downstream current-limiting fuse with an upstream protection device that utilizes di/dt sensing to predictively interrupt faults.

These and other objects of the present invention are achieved by defining operation of the instantaneous characteristic portion of an upstream protective device to coordinate with a downstream current-limiting fuse based on the peak let-through current of the downstream current-limiting device, with instantaneous operation being set to occur only above the peak let-through current of the downstream current-limiting fuse. Accordingly, for fault currents which are seen by both the instantaneous device and the current-limiting device and that are within the ratings of the current-limiting device, the upstream device will not respond and the downstream current-limiting fuse will interrupt the fault, as intended.

BRIEF DESCRIPTION OF THE DRAWING

The invention, both as to its organization and method of operation, together with further objects and advantages thereof, will best be understood by reference to the specification taken in conjunction with the accompanying drawing in which.

DETAILED DESCRIPTION

Figure 1:
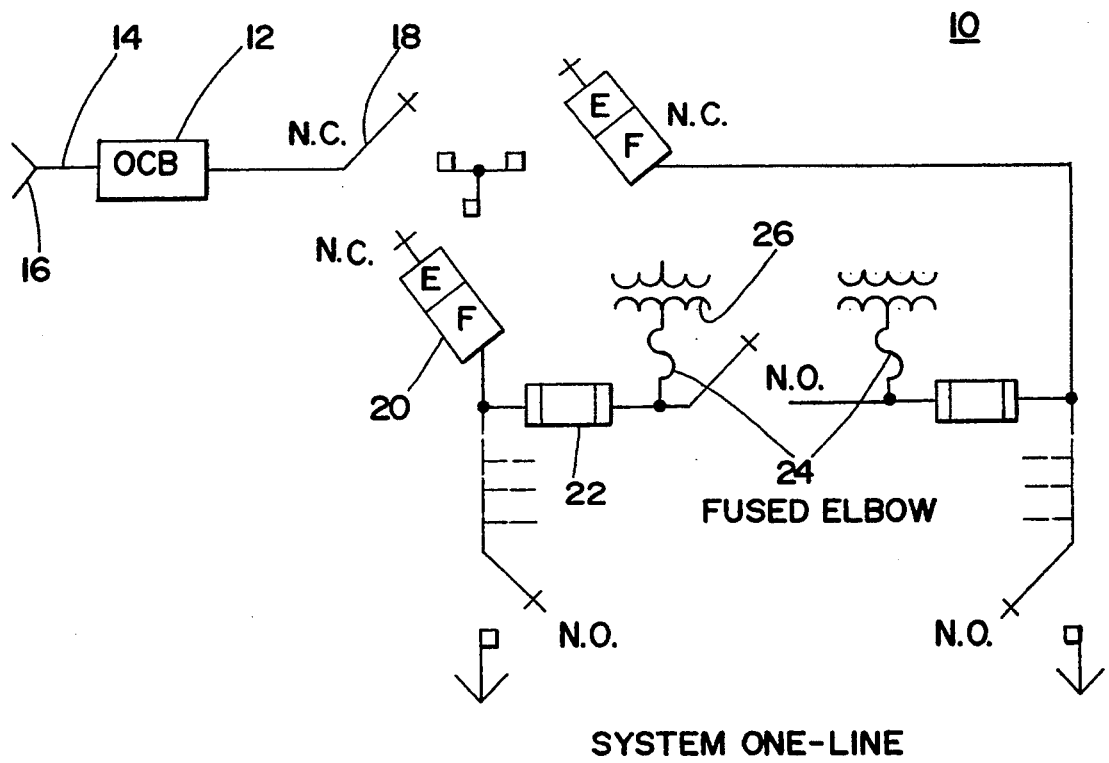
FIG. 1 is a system one-line diagrammatic representation of an illustrative circuit that is useful to describe the improved coordination arrangement of the present invention.

The system one-line diagram of FIG. 1 represents a portion 10 of an electrical power distribution system. Various protective devices are arranged at various points in the system to provide desired protection of components and the system where overcurrents including high-current fault conditions could exist. The illustrated portion 10 of the system includes a circuit breaker 12 connected to the 3-phase input conductor 14 from a high-voltage source (not shown) at input 16. In an illustrative example, the 3-phase input conductor 14 is energized at 13.8 kv, phase-m-phase, to provide a feeder in an underground distribution system. The feeder at the output of the circuit breaker 12 is connected through the series combination of a normally closed disconnect switch 18, an electronic power fuse 20 having a normally closed disconnect feature, a power fuse 22 protecting a lateral section, and a fused elbow connector 24. The fused elbow connector 24 feeds the primary winding of a transformer at 26, the secondary of the transformer being connected to the customer-served loads. Other circuits of the system are also shown in FIG. 1 to supply other loads through the depicted protective devices. In accordance with desired distribution engineering practices to protect the connected transformer, the fused elbow connector 24 has current-limiting properties.

Figure 2:
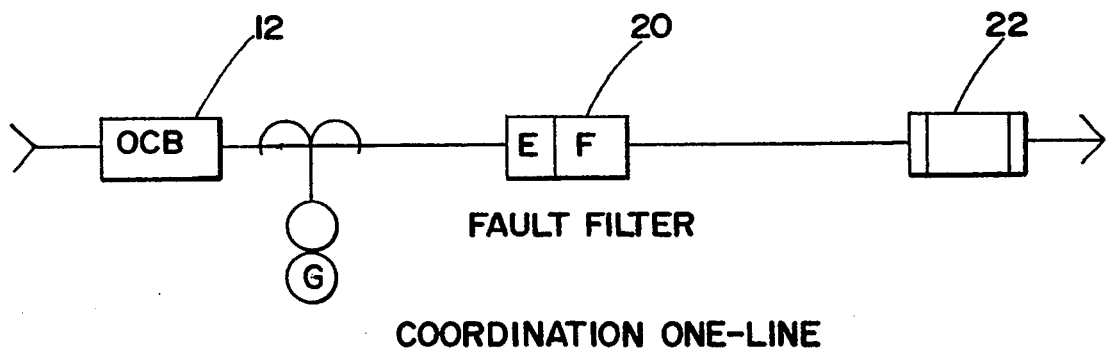
FIG. 2 is a coordination one-line diagrammatic representation of a portion of the circuit of FIG. 1.
Figure 3:
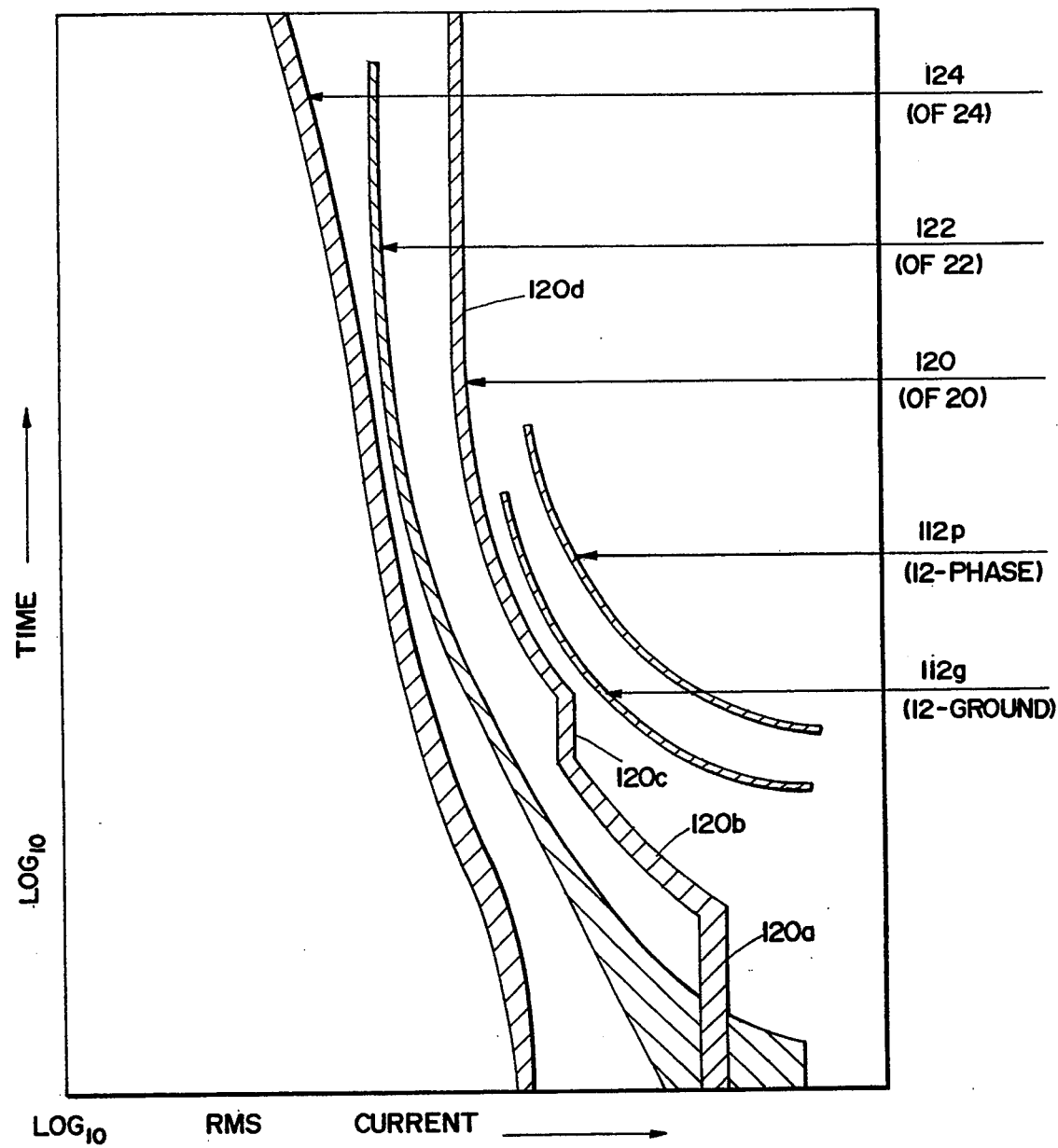
FIG. 3 is a time-current characteristic curve representing the operating times at various currents for the circuit components to illustrate the coordination of the circuit of FIGS. 1 and 2.

With additional reference to FIGS. 2 and 3, in order to achieve the desired coordination between the various series-connected protective devices 12,20,22, and 24 (so as to provide appropriate protection while minimizing the area to be de-energized in the event of a fault or overcurrent), the time-current characteristic (TCC) curve of each upstream device should be to the fight in FIG. 3 of the adjacent downstream device; that is, for a given current, each downstream device should operate before the adjacent upstream device. Thus, the coordination of the four devices 12,20,22, and 24 is illustrated in FIG. 3. While the intersection of the curves 122 and 120 represent an area where coordination is not ideal (i.e., miscoordination), both devices will respond which is acceptable for system practices.

While it has been stated that coordination is provided by the arrangement of the devices, it should be understood that the response of the current-limiting fuse of the fused elbow connector 24 is undefined for the areas of higher current; this response not being depicted by the curve 124 of FIG. 3. Thus, the curve 120 of the electronic power fuse 20 with instantaneous response characteristic portion at 120a may or may not coordinate properly with the curve 124 of the fused elbow connector 24.

In accordance with conventional coordination theory and practice, any coordination between the devices 20 and 24 would be analyzed by means of $I^2t$ let-through energy. Specifically, the total clearing $I^2 1$ of the downstream device 24 must be less than the minimum tripping $I^2 1$ of the upstream device 20. For the devices 20 and 24, this would lead to the conclusion that coordination is not possible since the $I^2 1$ of the device 24 remains relatively high in the higher current ranges as compared to the relatively lower minimum tripping $I_2 1$ value of the device 20. In fact, for many devices 20 with curves such as 120, coordination is not achieved in that manner.

Figure 4:
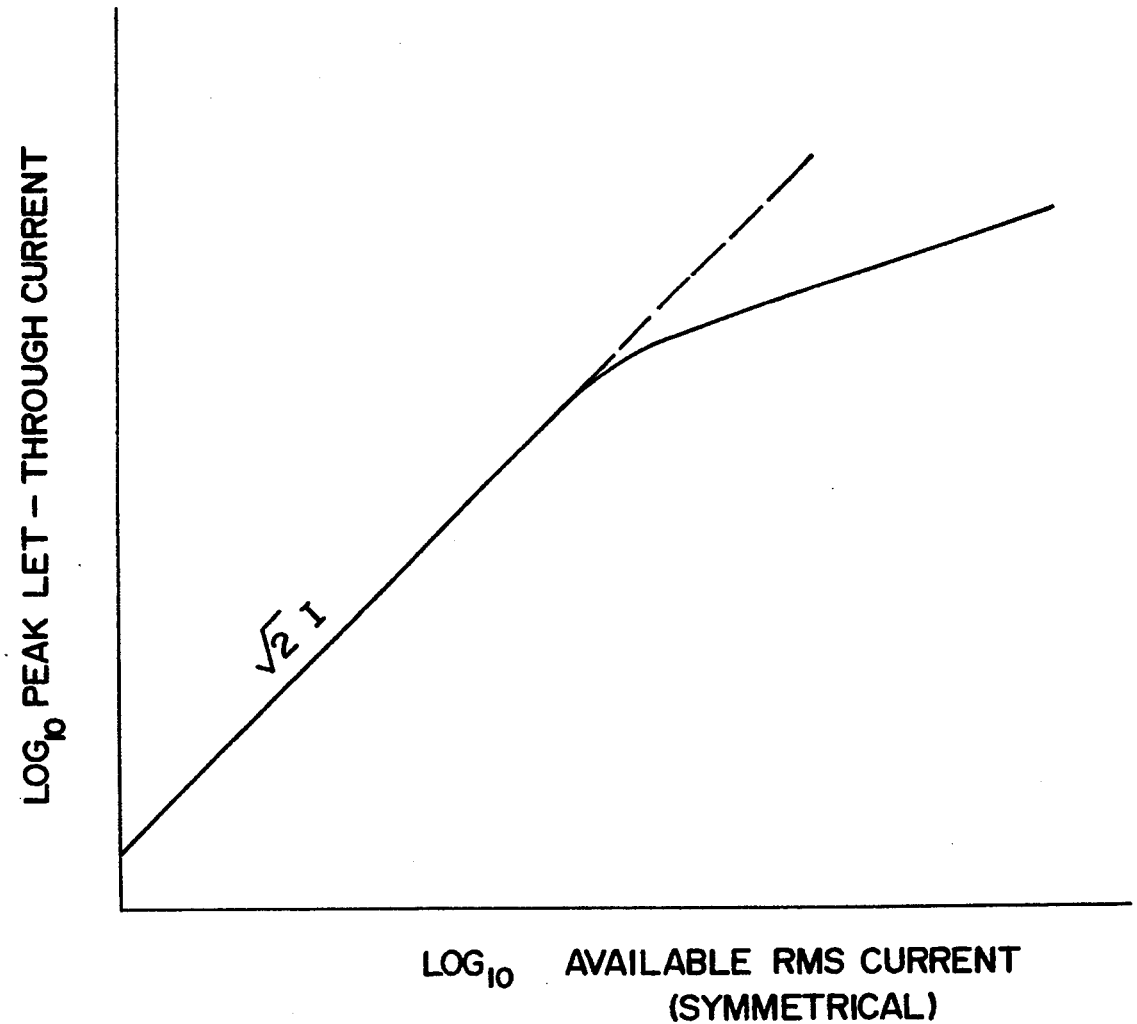
FIG. 4 is an illustrative curve representing the peak let-through current of a current-limiting device as a function of available current.

In accordance with important features of the present invention, it has been found that coordination can be achieved by consideration of the peak let-through current of the current-limiting device 24 along with the appropriate setting and selection of the parameters that determine the instantaneous response portion 120a for the electronic power fuse 20. That is, if the parameters that determine the instantaneous mode of operation of the fuse 20 are selected such that operation will not take place until the instantaneous magnitude of the current is above the peak let-through current of the device 24, coordination is achieved despite the fact that the minimum tripping $I^2 1$ of the upstream device 20 is less than the total clearing $I^2 1$ of the downstream device 24. For faults including currents with higher magnitudes beyond the momentary current capability of the device 24, the device 20 will respond. Similarly, the device 20 will also respond for faults which are not seen and thus not limited by the device 24, such as cable faults between the devices 20 and 24. An example of the peak let-through current characteristics of a current-limiting elbow connector 24 are illustrated in FIG. 4.

Figure 5:
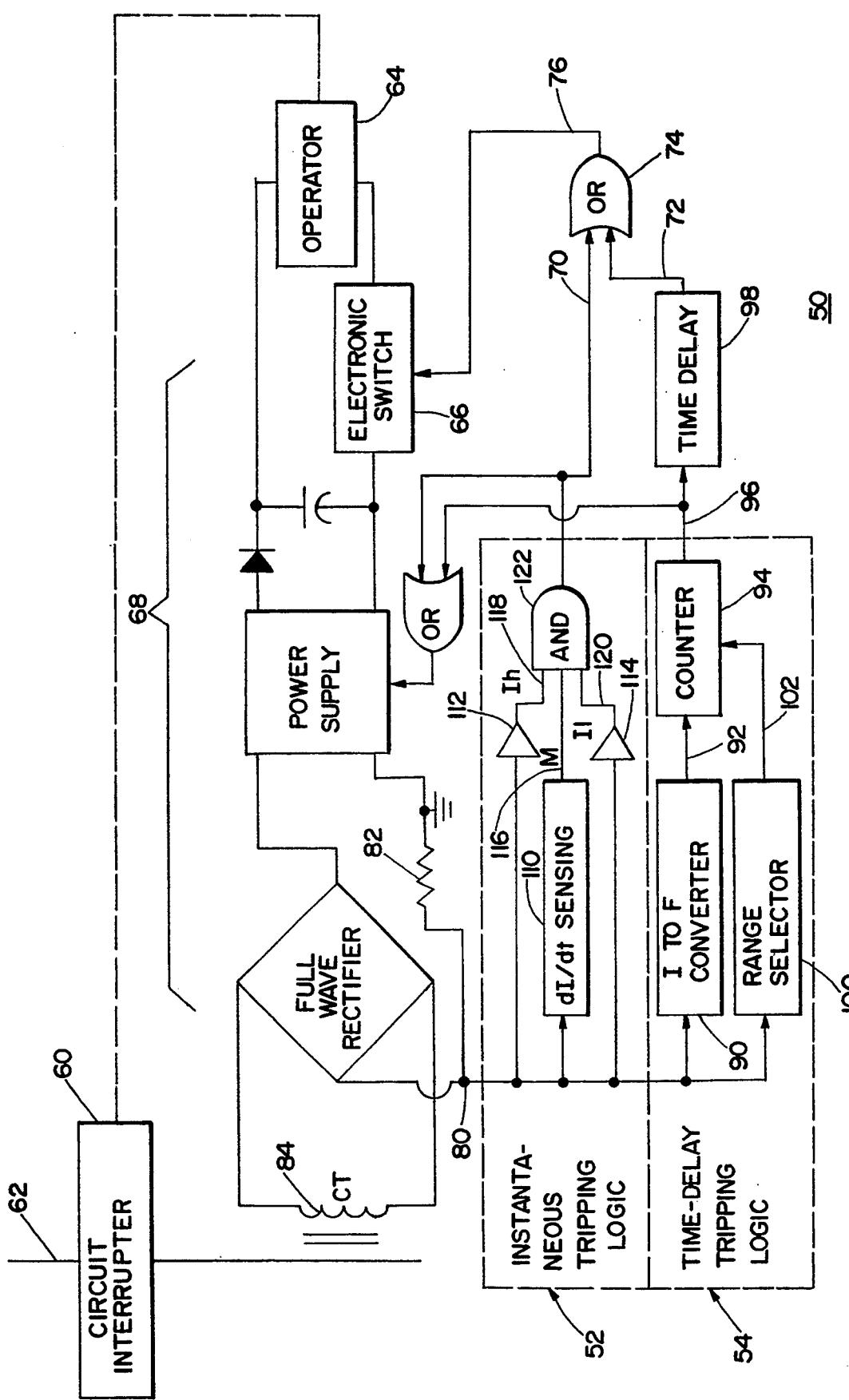
FIG. 5 is a schematic diagram of one of the devices utilized in the circuit of FIGS. 1 and 2 to achieve the coordination of the present invention.

With additional reference to FIG. 5, the control arrangement 50 is utilized for the determination of the curve 120 in FIG. 3 for the device 20. For example, a device of this type is illustrated in U.S. Pat. Nos. 4,342,978, 4,434,415, and 4,499,446, and the control arrangement is disclosed in U.S. Pat. No. 4,571,658. The control arrangement 50 achieves the TCC curve 120 via the combination of an instantaneous tripping section 52 and a time-delay tripping section 54. For example, in FIG. 2, the curve 120 includes a first time-delay portion 120d for a lower current range, a transition portion 120c, a second time-delay portion 120b over a higher current range, and the instantaneous portion 120a.

Considering now a specific implementation of the control arrangement 50 to practice the present invention, a circuit interrupter 60 of the electronic power fuse 20 is arranged to interrupt the current in a line 62 in response to an interrupter operator 64, which is a power cartridge in a specific embodiment. Operation of the interrupter operator 64 is controlled by an electronic switch 66 with energy being supplied by a power supply section 68. Operation of the circuit interrupter 60 is controlled to achieve the time-current characteristic curve 120 via control signals at 70,72 which are provided to the electronic switch through a logical "OR" gate 74 having an output 76 connected to the electronic switch 66. The control signal 70 is active to provide operation according to the portion 120a with the instantaneous tripping section 52 determining when the appropriate instantaneous parameters have been satisfied. Similarly, the control signal 72 is active to provide operation according to the portions 120b,c, and d with the time-delay tripping section 54 determining when the appropriate time-current parameters have been satisfied. To determine when the appropriate parameters have been satisfied, the instantaneous tripping section 52 and the time-delay tripping section 54 receive a sensed-current signal at 80 which is derived across a resistor 82 in the power supply section 68. A current-sensing transformer 84 is arranged to sense the current in the line 62.

The time-delay tripping section 54 utilizes a current-to-frequency (I to F) converter 90 which generates pulses at 92 at a frequency proportional to the current magnitude when the current exceeds a minimum overcurrent level. The output 92 of the I to F converter 90 is connected as an input to a counter 94. When a preset count is reached by the counter 94, an output at 96 is generated which, after a time delay via time-delay stage 98, is output at 72 to initiate the time-delay tripping mode. To accomplish the characteristics of portions 120b,c, and d, a range selector 100 controls the number of preset counts at which the counter 94 produces an output at 96. The range selector 100 is arranged to provide a different preset count number at control line 102 to the counter 94 for different current ranges. Thus, in a current range corresponding to currents above the portion 120c, the preset number at 102 is decreased for the counter 94 to provide an output at 96 which introduces the downward shift at 120c, which is also referred to as a truncation. Examples of detailed circuitry to accomplish this are set forth in U.S. Pat. No. 4,642,724. Thus, the time-delay tripping section 54 operates to provide the portions 120d,c, and b. The instantaneous tripping section 52 provides a fast response, as illustrated by the portion 120a for high overcurrents, the instantaneous tripping section 52 providing a control output at 70 to initiate circuit interruption before the time-delay tripping section 54 would be active at control output 72.

The instantaneous tripping section 52 operates to generate a control signal at 70 when the sensed current at 80 represents a current having a rate of change of current (di/dt) that exceeds a predetermined rate and the instantaneous current magnitude being in a range of current or a "window". Specifically, the instantaneous tripping section 52 includes a di/dt detector stage 110, an upper window detector stage 112, and a lower window detector stage 114. Each of the stages 110,112, and 114 are responsive to the sensed-current signal at 80. The di/dt detector stage 110 provides an output at 116 when a preselected rate of change of current value M is exceeded, corresponding to the slope of a predetermined RMS current. The upper window detector 112 outputs a signal at 118 when the current is below an upper instantaneous magnitude Ih. The lower window detector 114 outputs a signal at 120 when the current is above a lower instantaneous magnitude I1. The signals at 116,118, and 120 are connected as inputs of a three-input AND gate 122. The output of the AND gate 122 provides the control signal at 70 that initiates the instantaneous circuit interruption mode. Thus, the control signal at 70 to initiate the instantaneous tripping mode is generated whenever the instantaneous current is between Ih and I1 and the rate of change of current at the time exceeds M.

The parameters M, Ih, and I1 are selected to provide instantaneous operation in the presence of currents which are predicted by these parameters to reach levels at which the instantaneous operation is desirable. In the case of the present invention to coordinate with a downstream current-limiting fuse, the instantaneous parameters are selected so that instantaneous operation does not occur in a current waveshape (within the capabilities of the current-limiting device) before the point at which the current-limiting fuse would limit the current and operate, which corresponds to the peak let-through current, an instantaneous peak magnitude parameter.

Considering now an illustrative example, for a fused elbow connector 24 (Joslyn PF8-30) with peak let-through current of approximately 6.0 kA for an available fault current of 20 kA RMS (symmetrical), the lower window parameter I1 is set to approximately 6.2 kA (instantaneous magnitude), the upper window parameter Ih is set to approximately 8.5 kA (instantaneous magnitude), and the rate of change parameter M is set to approximately 3.2 amperes/microsecond (corresponding to a 6.0 kA RMS current). Accordingly, for high fault currents (e.g., in the range of 10–20 kA RMS) seen by both devices 20 and 24, the peak let-through current allowed by the current-limiting device 24 will be less than the lower window setting of 6.2 kA. While the di/dt parameter may be met, since the instantaneous magnitude is below 6.2 kA, the device 20 will not initiate interruption and the fault, as intended, will be cleared by the current-limiting device 24.

While there have been illustrated and described various embodiments of the present invention, it will be apparent that various changes and modifications will occur to those skilled in the art. It is intended in the appended claims to cover all such changes and modifications that fall within the true spirit and scope of the present invention.

What is claimed and desired to be secured by Letters Patent of the U.S. is:

1. In an electrical power distribution system, the combination of:
   a first protective device connected in circuit in the electrical power distribution system and including means for interrupting current in accordance with an instantaneous operating characteristic and being responsive to an enabling input;
   a second protective device connected in circuit downstream of said first protective device and including means for interrupting current having current-limiting characteristics and defined peak let-through characteristics, said defined peak let-through characteristics including a peak let-through current level for a range of high fault currents; and
   means for coordinating operation of said first and second protective devices in said range of high fault currents such that said second protective device operates to interrupt current before said first protective device, said coordinating means including means for generating said enabling input to enable operation of said instantaneous operating characteristic of said first protective device when the instantaneous magnitude of the current is above said peak let-through current level.

2. The combination of claim 1 wherein said first protective device includes means responsive to said enabling input for detecting the rate of change of current and initiating current interruption when the rate of change of current exceeds a predetermined value and said enabling input is present.

3. The combination of claim 2 wherein said first protective device further comprises means for defining an inverse time-current characteristic for current ranges below said range of high fault currents.

4. The combination of claim 1 wherein said current interrupting means of said first protective device includes means responsive to said enabling input and the current for predicting the occurrence of an overcurrent which, if not interrupted, will exceed a predetermined value, and means responsive to said predicting means and said enabling input for generating a trip signal to initiate current interruption.

5. The combination of claim 1 wherein said generating means further comprises means responsive to the current for producing a rate signal when the rate of change of the current exceeds a predetermined rate, means responsive to the current for producing a window signal when the instantaneous value of the current is greater than a first value and less than a second value, and means responsive to said rate signal and said window signal for producing said enabling input.

6. The combination of claim 5 wherein said first value is equal to said peak let-through current level.

7. The combination of claim 1 wherein said generating means further comprises means for determining the rate of change of the current, said generating means generating said enabling input only when the rate of change of the current exceeds a predetermined level.

8. The combination of claim 7 wherein said generating means further comprises means for determining that the current is less than a predetermined level which is greater than said peak let-through current level, said generating means generating said enabling input only when the current is less than said predetermined level.

9. An arrangement for coordinating operation of an upstream protective device that has an instantaneous operating characteristic over at least a portion of a predetermined operating range of currents with a downstream current-limiting device having defined peak let-through current characteristics by setting said instantaneous operating characteristics of said upstream protective device above said peak let-through current of said downstream device, said instantaneous operating characteristic of said upstream device being determined in accordance with parameters including a minimum instantaneous current magnitude.

10. A method for coordinating operation of an upstream protective device that has an instantaneous operating characteristic over at least a portion of a predetermined operating range of currents with a downstream current-limiting device having defined peak let-through current characteristics comprising setting said instantaneous operating characteristics of said upstream protective device above said peak let through current of said downstream device, said instantaneous operating characteristic of said upstream device being determined in accordance With parameters including a minimum instantaneous current magnitude.

* * * * *

UNITED STATES PATENT AND TRADEMARK OFFICE
CERTIFICATE OF CORRECTION

PATENT NO. : 5,402,299

DATED : March 28, 1995

INVENTOR(S) : Terrance A. Bellei

It is certified that error appears in the above-identified patent and that said Letters Patent is hereby corrected as shown below:

Col. 2, line 68, "phase-m-phase" should be -- phase-to-phase --;

Col. 3, lines 44, 46, 48, 66, and 67, "I²l" should be -- $I^2t$ --;

Col. 3, line 50, "I₂l" should be -- $I^2t$ --;

Claim 10, col. 8, line 13, "With" should be -- with --.

Signed and Sealed this

Thirtieth Day of May, 1995

Attest:

BRUCE LEHMAN

Attesting Officer

Commissioner of Patents and Trademarks